A. C. JOHNSTON.
COAL PILE.
APPLICATION FILED DEC. 14, 1918.
Reissued Feb. 25, 1919. 14,598.
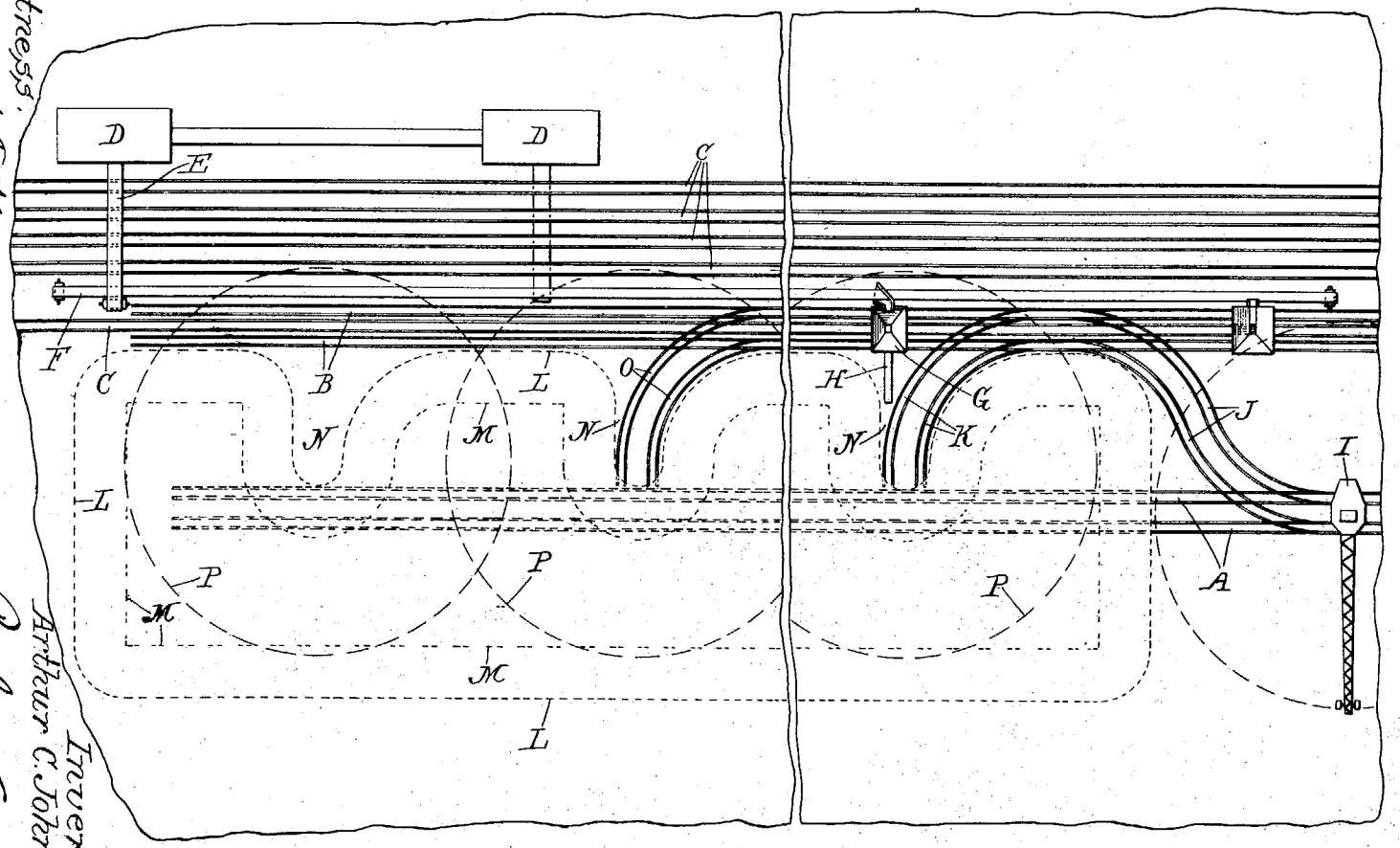
Witnesses.
Edward T. Wray
Inventor
Arthur C. Johnston
by Parker & Carter
Attorneys.

UNITED STATES PATENT OFFICE.

ARTHUR C. JOHNSTON, OF CHICAGO, ILLINOIS, ASSIGNOR TO LINK-BELT COMPANY, OF CHICAGO, ILLINOIS, A CORPORATION OF ILLINOIS.

COAL PILE.

14,598. Specification of Reissued Letters Patent. Reissued Feb. 25, 1919.

Original No. 1,256,569, dated February 19, 1918, Serial No. 138,184, filed December 21, 1916. Application for reissue filed December 14, 1918. Serial No. 266,818.

*To all whom it may concern:*

Be it known that I, ARTHUR C. JOHNSTON, a citizen of the United States, residing at Chicago, in the county of Cook and State of Illinois, have invented new and useful Improvements in Coal Piles, of which the following is a specification.

Coal, as is well known, when in storage deteriorates and chemical action takes place sometimes resulting in spontaneous combustion. The only way the fires thus formed can be extinguished is by removing the coal and restoring it, and where coal is stored in large quantities, this becomes a very important problem, because of the difficulties in getting through the coal which is not burning so as to get at the coal which is burning, and it is for this reason that coal is ordinarily stored in small isolated unit groups with space between the groups for the movement of the coal handling mechanism.

My invention relates to a new and improved storage pile for coal and process of storing coal and the like and has for an object to provide means whereby the coal may be stored, handled and protected with a minimum of danger and a minimum of expense. Another object is to provide a process and means for handling or storing coal in large quantities in such a way that the coal in any part of the storage zone may be taken out in emergency at the will of the operator. Other objects will appear from time to time in the specification.

My invention, therefore, relates to a method of piling coal or other material, and consists in doing this in such way as to produce a continuous longitudinally extended coal pile made by depositing material continuously from one end to the other with a series of recesses or pockets built in the side thereof extending toward the middle longitudinal axis of the pile and spaced so that a suitable conveyer, by operating from the bottom of said pockets successively, may pick up and remove practically all the material of the pile.

In the piling of materials such for example as coal, it is of course very much easier to pile continuously from one end and to deposit the material so as to make one continuous pile. The apparatus and machinery for piling the coal begins at one end of the proposed pile, and retreats toward the other.

The invention is illustrated more or less diagrammatically in the accompanying drawings herein showing a plan view of a coal plant arranged to carry out my invention.

A, A are crane tracks arranged longitudinally along the center of the elongated storage pile or zone.

B, B are similar crane tracks arranged parallel with the tracks A, A along one side of and just removed from the coal storage zone.

C, $C^1$ are railroad tracks of the usual type along which railway cars are free to pass in the usual way.

D, D represents coal handling and disposing stations from which coal is discharged or fed along conveyer E to belt conveyer F, which belt conveyer F runs parallel with the crane tracks.

G is a movable coal stacker free to travel along the crane tracks B, B, the belt conveyer F being adapted to discharge coal into the stacker. The stacker itself is provided with a boom H and is adapted to discharge coal onto the ground adjacent the tracks B.

I is a crane having a relatively long radius, adapted to travel along the tracks A, A.

J, J are crane switch tracks leading diagonally from tracks A, A to tracks B, B at a point removed from the storage zone.

K, K are temporary movable emergency crane tracks adapted to extend inwardly from the tracks B, as shown toward the heart of the pile.

In my drawing I have shown the storage station filled to the limit of its capacity and it will be observed that the single dotted line L is the boundary of the outside or base of the pile and that the double dotted line M is the crest line of the pile. It will be understood that the space included by the line M is flat, that is to say that the top of the pile is flat and that the space between the lines L and M is inclined, that is to say, it is the slope of the pile.

It will be noted that the tracks A are completely covered up by the body of the pile but that the track B is not so covered and that the crane is free to travel along track A were it not covered by the pile.

In erecting my form of coal pile, the crane will start at the left-hand end of the pile on the central track A. The coal stacker will be on the track B adjacent the crane and coal will be fed from the handling houses through the different parts of the conveyer system and discharged onto the ground inside the base of the pile near the crane. The crane will be operated to pick up this coal and to distribute it over the ground to be occupied by the pile, the crane and the stacker gradually move backward toward the right as the pile is completed. It will be noted that the radius of the crane is such that as it travels along the central track, it can pick up and deposit coal at any point clear out to the edge of the base at either side.

The pile will gradually be made then by manipulating this crane with its usual excavating or dipper bucket, care being taken as the crane moves back to leave the series of scallops or notches or pockets as indicated at N. These notches or pockets may each be provided with a permanent spur crane track O, as indicatel, instead of the single removable emergency track or both together, as the case may be. In any event, however, the size of opening is such that a crane track may be placed there or if one is there, it will be left free so that a crane could come in along the track. The distance between these pockets is such that a crane traveling in along the track in such pockets will be able to pick up coal within only one of the circular lines P. These circular lines P demark zones substantially covering although not entirely covering the entire area of the pile.

The process above suggested is continued until the coal storage area is filled as indicated in the drawing. The crane will then be moved clear out of the storage area.

As is well known when coal is stored in bulk it frequently happens that spontaneous combustion takes places and it becomes necessary to dig out the coal as otherwise the fire cannot be extinguished. The crane which travels along the middle of the pile and stacks coal on both sides can not get back along the central track because the pile covers the track. It is not sufficient to dig coal out of the body of the pile by said track, because that necessitates having tracks on both sides and reduces the available storage room and so in the past it has been customary to leave the central aisle open and obviously it very materially reduces storage capacity. By using my process and my pile, therefore, I increase the coal storage capacity by filling up the central track area, but I retain the necessary accessibility by leaving one side of the base recessed as shown, because the total loss in storage space is much less than the loss which would be occasioned by leaving an aisle down the center of the pile for a crane to travel through.

Under ordinary service conditions the coal will be taken out of storage by running the crane down the center track in a direction opposite the direction it travels in storing the coal. If, however, a fire should break out somewhere in the middle of the storage area, the crane would be run down along the side track and then into the nearest opening in the pile until it reached almost to the center of the pile. The operator would then proceed to dig out the burning coal until the fire could be reached and extinguished. Of course, the crane on this spur track could not get quite to the center of the pile but it could get near enough for all practical purposes and experience shows that there is little if any danger of fire in that part of the pile which the crane could not reach.

The use and operation of my invention are as follows:—

The coal or other material is commonly arranged in two longitudinal piles on opposite sides of a central track from which the coal is deposited and collected by a crane. If to utilize a given floor space, the coal or other such material should be arranged in a pile covering the crane track or the space ultimately left between the two longitudinal piles, the result will be, of course, a pile very much wider than either of the others and wider than both of them together. This arrangement, however, would make it impossible to attack the pile, for any purpose, except at one end, assuming that the whole available floor space has been covered by the pile.

This is liable to the objection that in order to get at any part of the pile for collecting or removing, it is necessary to first remove all of the coal in the pile from one end to the point in question. To obviate this difficulty while retaining the larger pile arrangement of the coal, I deposit the coal on each side of the middle track by means of a coal depositing apparatus, and I cover the track back of the retreating apparatus. The depositing apparatus is, however, manipulated so as to leave indentations or recesses along one side of the pile, thus to that extent, but not very considerably reducing the pile.

When the pile is finished, if it becomes necessary to attack at any point, the same depositing means, which now becomes a collecting means, can be applied at the end of the pile or at any one of the recesses, and since these recesses extend approximately to the middle line of the pile and are separated by a distance approximately equal to the width of the pile, or to twice the effective working radius of the depositing and collecting means, it is obvious that such collecting means can reach any part of the pile. The arrangement of the pile in this manner, therefore, permits the collecting means, or if the means in question is both a collecting and depositing means, to lay a pile the maximum width and then attack it at any point along its length for collecting or removing.

I claim:

1. A pile of material having a series of recesses along a side thereof extending inwardly thereinto, the distance between adjacent recesses being approximately equal to the width of the pile.

2. An elongated pile of material having a series of recesses along the sides thereof extending inwardly thereinto, the distance between adjacent recesses being approximately equal to twice the distance between each recess and the opposite side of the pile.

3. A pile of material having a series of recesses along one side thereof extending inwardly approximately to the center thereof, the distance between adjacent recesses being approximately equal to the width of the pile.

4. The combination with a pile of material having a series of recesses along the sides thereof, extending inwardly thereinto of a material handling device adapted to penetrate within said recesses to overhang the pile, the distance between the inner extremities of any two adjacent recesses being equal substantially to twice the effective radius of the material handling apparatus.

5. A pile of material having a series of recesses along one side thereof extending inwardly approximately to the center thereof, the distance between adjacent recesses being approximately equal to twice the distance between each recess and the opposite side of the pile.

6. A pile of material having a series of recesses along a side thereof extending inwardly thereinto substantially to the middle of the pile, the remainder of the pile except aforesaid recesses being substantially continuous, the distance between such recesses being such that a material handling apparatus in one recess may reach to the edge of the pile opposed from the recess and cover the space between it and the space reached by a similar material handling apparatus in the other recess.

7. The method of storing and handling material which consists in depositing it in an elongated pile, with a series of recesses along the side of said pile which extend approximately to its middle line, the width of the pile and the distance between the recesses being approximately equal to twice the effective working radius of the collecting means.

8. The method of storing and handling material which consists in depositing it from a middle line on both sides thereof in an elongated pile, with a series of recesses along the side of said pile which extend approximately to its middle line, the width of the pile and the distance between the recesses being approximately equal to twice the effective working radius of the collecting means.

9. The method of storing and handling material which consists in depositing it from a middle line upon both sides thereof in an elongated pile whose width is approximately twice the effective working radius of such depositing means, leaving a series of recesses along the side of said pile which extend approximately to its middle line, the width of the pile and the distance between the recesses being approximately equal to twice the effective working radius of the collecting means.

10. The method of storing and handling material which consists in depositing it from a middle line on both sides thereof in an elongated pile, leaving a series of recesses along the side of said pile which extend approximately to the middle line, the width of the pile and the distance between the recesses being approximately equal to twice the effective working radius of the depositing and collecting means.

11. The method of storing material which consists in forming an elongated pile by depositing successively increments of the material from one end of the proposed pile to the other and so distributing the material as to form a series of recesses along one side of the pile.

12. The method of storing material which consists in forming an elongated pile by depositing successively increments of the material from one end of the proposed pile to the other and so distributing the material as to form a series of recesses along one side of the pile, said recesses extending approximately to the middle line of the pile.

13. The method of storing material which consists in forming an elongated pile by depositing successively increments of the material from one end of the proposed pile to the other and so distributing the material as to form a series of recesses along one side of the pile, said recesses extending approximately to the middle line of the pile and separated by a distance approximately equal to the width of the pile.

ARTHUR C. JOHNSTON.